US006373484B1

(12) United States Patent
Orell et al.

(10) Patent No.: US 6,373,484 B1
(45) Date of Patent: Apr. 16, 2002

(54) METHOD AND SYSTEM FOR PRESENTING DATA STRUCTURES GRAPHICALLY

(75) Inventors: Dror Orell, Haifa; Shmuel Ur, Misgav; Dror Zernick; Zachi Karni, both of Haifa, all of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/234,461

(22) Filed: Jan. 21, 1999

(51) Int. Cl.⁷ .............................................. G06T 17/00
(52) U.S. Cl. ...................... 345/420; 345/440; 345/763; 345/853; 712/11
(58) Field of Search ........................... 717/3; 714/100; 345/418, 420, 763, 853, 440; 700/1; 712/11

(56) References Cited

U.S. PATENT DOCUMENTS

| 5,825,369 A | * 10/1998 | Rossignac et al. .......... 345/440 |
| 5,903,770 A | * 5/1999 | Rolfe et al. .................... 717/11 |
| 6,138,270 A | * 10/2000 | Hsu ............................... 717/3 |

OTHER PUBLICATIONS

Anupam et al., "DataSpace : 3–D Visualizations of Large Databases", IEEE, 1995, pp. 82–88.*
Karni, Z. et al., "Using 3D to Visualize Dynamic Path Coverage", Quality Week, May 26, 1998.
Buchnik, E. et al., "Compacting Regression–Suites On–the–Fly", Proceeding of the 4th Asia Pacific Software Engineering Conf., pp. 385–394, Dec. 1997.
Factor, M. et al., "Rigorous Testing Using Snapshot," Israeli Conf. on the Theory of Computers and Systems (ISTCS), Herzelia, Israel, May 1997.
Maareck, Y. et al., "WebCutter: A System for Dynamic and Tailorable Site Mapping," Journ. of Computer Network and ISDN Systems 29 (1997) 1269–1279.
Ur, S. et al, "Off–the–Shelf vs. Custom Made Coverage Models, Which is the One for You?", STAR98.

* cited by examiner

*Primary Examiner*—Mark Zimmerman
*Assistant Examiner*—Kimbinh T. Nguyen
(74) *Attorney, Agent, or Firm*—Browdy and Neimark (57) ABSTRACT

A computer-implemented method and system for graphically displaying at least two edges extending between common points in a graphical structure. A particular implementation relates to the display of execution paths of a computer program component having multiple execution paths so as to allow proper differentiation between the execution paths. The computer program component is processed so as to derive a data structure containing nodes representing all basic blocks thereof, edges representing lines connecting the nodes, and execution paths traversed during operation of the computer program, component. The resulting data structure is displayed graphically in 3-D. In order to allow the execution paths to be distinguished when they pass along the same edge of the graph, different sections of the edge are color coded. This can be done by spatially separating the edges and coloring each edge uniquely; or by dividing each edge into different colored sections in respect of each execution path. Alternatively, there can be superimposed on each edge one or markers each corresponding to a different execution path and each having a unique color.

28 Claims, 7 Drawing Sheets

METHOD AND SYSTEM FOR PRESENTING DATA STRUCTURES GRAPHICALLY

FIELD OF THE INVENTION

This invention relates to tools for the graphic presentation of data structures and to an application thereof for testing software performance.

REFERENCES

Many of the prior art techniques mentioned in the next section are discussed in greater detail in the following publications:

[1] B. Beizer. *Software testing techniques.* Van Nostrand Reinhold, 1990.

[2] F. P. Brooks. The Mythical Man-Month: Essay on Software *Engineering,* Addison-Wesley, 1995.

[3] E. Buchnik and S. Ur. Compacting regression-suites on-the-fly. In *Proceeding of the 4th Asia Pacific Software Engineering Conference,* pages 385–394, December 1997.

[4] Michael Factor, Eithan Farchi and Shmuel Ur. *Rigorous Testing Using Snapshot.* Israeli Conference on the Theory of Computers and Systems (ISTCS), Herzelia, Israel, May 1997,

[5] C. Kaner. Software negligence and testing coverage, In *Proceedings of the STAR* 96: the *Fifth International Conference, Software Testing, Analysis* and *Review,* pages 299–327, June 1996.

[6] H. Levkowitz. *Color Theory and Modeling for Computer Graphics, Visualization, and Multimedia Applications.* Kluwer Academic Publishers, 1997.

[7] B. Marick *The Craft of Software Testing, Subsystem testing Including Object-Based and Object-Oriented Testing.* Prentice-Hall 1998.

[8] Y. S. Maarek, M. Jacovi, M. Shtalhaim, S. Ur, D. Zernik, and I. Z. Ben Shaul, WebCutter: A system for dynamic and tailorable site mapping, In the Proceedings of the Sixth International World Wide Web Conference, Santa-Clara, April 1997.

[9] S. Ur and A. Ziv Of-The-Shelf Vs. Custom Made Coverage models, Which is the One For You, STAR98

[10] U. Yahalom and A. Lichter. White Box Testing of C Programs, yearly software project, Technion.

[11] D. Zernik and G. Zodik. A graph management framework for 3D visualization. IBM Object Technology 97.

BACKGROUND OF THE INVENTION

Data structures may be presented graphically as nodes interconnected by lines or edges. For example, a computer program can be presented graphically by means of many nodes each representative of a program block, interconnected by branches showing control flow between the various program blocks. Generally, graphical representation of such structures is prone to two problems. First, multiple coincident branches cannot be distinguished from one another. This makes it impossible to discern whether two nodes are joined by a single branch or several overlapping branches. Secondly, even if this problem is overcome, it remains impossible to trace a path which spans several nodes, since all edges appear identical. These drawbacks are manifest in graphical tools for program testing.

Testing is one of the biggest problems of the software industry. It has been shown that the cost of testing is usually between 40–80% of the development process as compared with less than 20% for the coding itself. The practice of letting the users find the bugs and fixing them in the next release, is becoming dangerous and costly for three main reasons: reputation and brand-name are harmed; replacing the software can be very costly when there is a large installation base; and there is the danger of litigation if the software error caused harm to the user. Therefore, thorough testing is required and care must be exercised to ensure that testing resources are used efficiently.

Modern software products are increasingly complex and typically offer literally thousands of options. In order to test software in such a manner that bugs can be reliably detected, it is necessary to run the software through each of the possible control paths. In fact, since bugs can be a function of the order in which options are selected, proper testing requires that the order of selecting options be varied accordingly and that the control flow be observed.

The main technique for demonstrating that the testing has been thorough is called test coverage analysis. Simply stated, software testing requires that there be created, in some systematic fashion, a large and comprehensive list of tasks and that some check be initiated to ensure that each task is covered in the testing phase. Coverage can help in monitoring the quality of testing, in creating tests for areas that have not been tested before, and with. forming small, yet comprehensive, regression suites.

Coverage is defined as any metric of completeness with respect to test selection criteria [1]. Many such metrics have been suggested in the past [1] [5], of which statement coverage is the most common. The statement coverage model measures against a set of tests, for each statement, if the statement were executed by one of the tests. When using any coverage model, a metric is created against which the quality and completeness of the testing is measured.

The most commonly used coverage metrics, such as statement coverage and branch coverage are based on the control flow of the program. However, many other metrics exist. Some coverage metrics are based on the data flow of variables, like define-use [1], while others are based not on the program code but on the inputs or the specifications [10].

Assessing coverage results is a difficult task. One of the main problems is that there are many details and, as a result, it is hard "to see the wood for the trees". For example, it may occur that many statements are not covered owing to a single cause, but superficial analysis will show only a list of statements not covered without showing their interrelationship. Amongst the most commonly used coverage models are statement coverage and branch coverage, whilst more recently proposed is forward path as described by Factor et al. [4]. All of these models define criteria for dealing with the control flow of the program.

Coverage results, whether of branch coverage, statement coverage or path coverage, produce a vast amount of information. Known methods for presenting this information are in textual form, such as a list or table. These suffer from several drawbacks. First, global analysis of the coverage information is difficult since textual information can cover many pages. Furthermore, presenting a one to many relation is cumbersome in textual format, as basic blocks can only be presented one after the other. As a result, such approaches militate against an intuitive perception of the flow of control.

It is therefore known to use two-dimensional graphical images to represent coverage results so as to provide a more intuitive global view than can be achieved textually. McCabe and Associates, Inc. of Columbia, U.S.A. offer a software testing tool known as "Visual Testing Toolkit" allowing two-dimensional graphical display of a structure chart of a system. Modules are shown as blocks which are interconnected via control paths. The modules are color-coded based on whether or not they have been tested so that untested areas may be quickly identified. Viewing the entire control graph allows points of interest, such as the most frequently used basic block etc., to be pinpointed and provides a clear view of the flow of control during the program's execution. Those paths in the program which have yet to be tested are shown both graphically and in the form of a listing.

Nontrivial programs have large and complex control graphs. Presenting coverage information as a graph in two dimensions not only requires substantial space but might become incomprehensible due to many intersecting edges. Both factors militate against achieving an intuitive global view.

Figure 1:
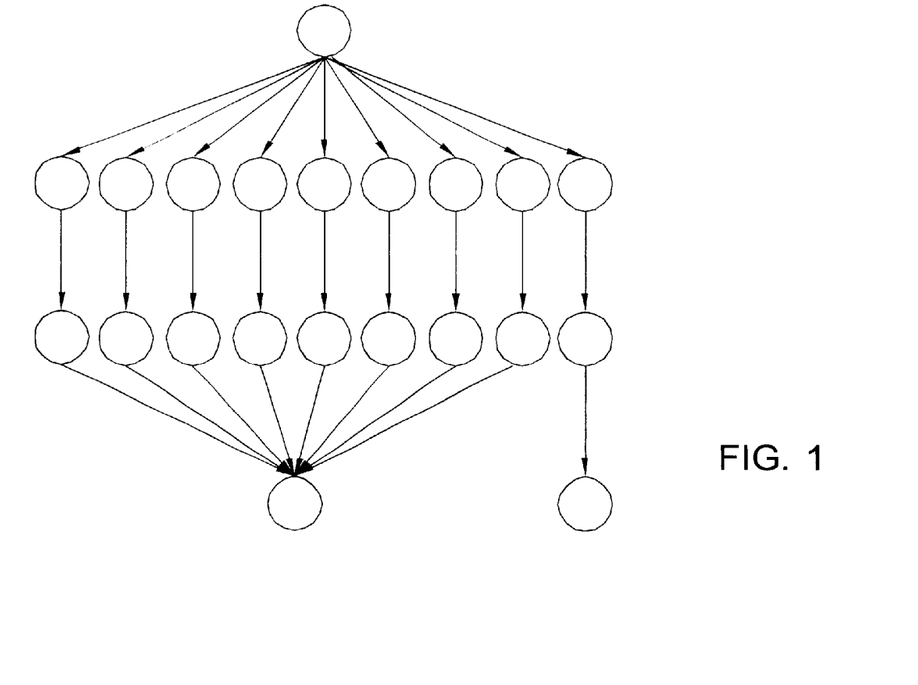
FIG. 1 is a 2-D graphical representation of a segment of a control graph describing a "case" statement.

FIG. 1 shows a 2-D graphical representation of a segment of a control graph describing a "case" statement. It will be appreciated that this segment is but one small component of the complete control graph, and yet requires significant area for its effective display. Clearly, to display a 2-D representation of the entire control graph would require a display medium of such large size, that it cannot be done.

It thus emerges that notwithstanding the advantages of displaying coverage results as a 2-D control graph, the effective use of 2-D is limited to the display of sub-components of the control graph and is not suited to the display of the entire control graph. Seeing that the very reason for using a graphical, rather than a textual, representation is to allow the coverage results to be displayed in their entirety for instant assimilation by the user, this limitation is a major drawback.

Although presenting coverage results graphically allows information to be imparted much more compactly than can be done textually, it does not in itself allow easy differentiation of multiple paths in the control graph. It is difficult to show path coverage graphically for several reasons. First, multiple paths typically pass through a single edge of the control graph. If every path has a different marking, then an edge through which several paths pass, needs to have an equal number of distinguishing characteristics. Also, a lot of information must be presented in a manner which can easily be assimilated by the user without the need to plow through many pages of information.

SUMMARY OF THE INVENTION

It is therefore an object of the invention to provide a method for graphically displaying control data of a computer program having multiple paths in such a manner than the paths can be visually distinguished.

To this end there is provided, in accordance with a broad aspect of the invention, a computer-implemented method for displaying data representative of at least two edges branching between a pair of nodes so as to allow the edges to be separately identifiable, the method comprising the steps of:

(a) assigning different display attributes to the edges so that the edges can be visually distinguished, and (b) displaying said data structure graphically in 3-D.

Such a method finds particular application for graphically displaying execution paths of a computer program component having multiple execution paths, which are represented by the edges, wherein prior to step (a) there is included the step of:

processing the computer program component so as to derive a data structure containing said nodes being representative of all basic blocks thereof, said edges representing lines connecting said nodes, and said execution paths being traversed during operation of the computer program component.

The use of three dimensions almost eliminates the chance of edge intersection and enables displaying more information in one frame. More particularly, a global overview of the coverage information of a procedure, which contains many details, can be presented in one view. This enables areas of interest to be pinpointed with ease. It further provides the ability to display path information, thus presenting the flow of control in a graphical way.

BRIEF DESCRIPTION OF THE DRAWINGS

In order to understand the invention and to see how it may be carried out in practice, a preferred embodiment will now be described, by way of non-limiting example only, with regard to a method and system for graphically displaying execution paths of a computer program component having multiple execution paths, and with reference to the accompanying drawings, in which.

DETAILED DESCRIPTION OF A PREFERRED EMBODIMENT

Figure 2:
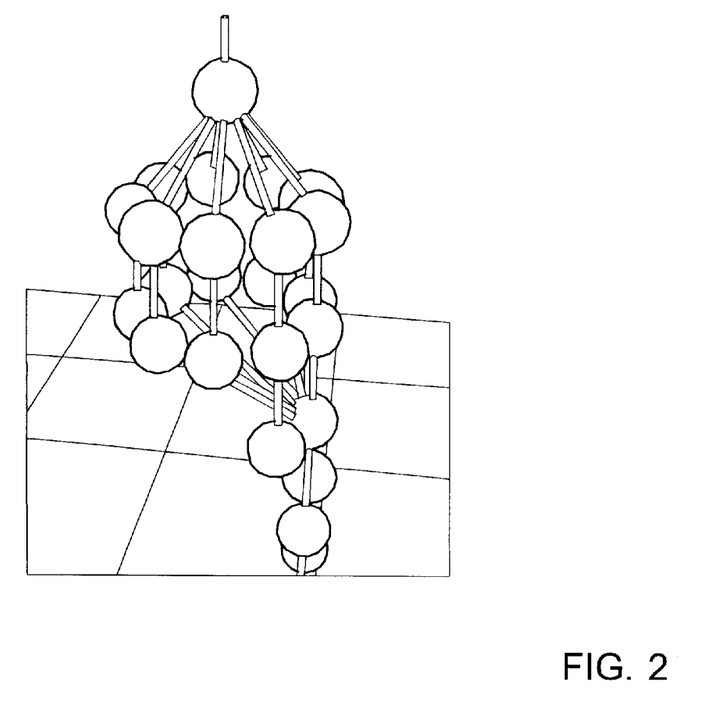
FIG. 2 is a 3-D graphical representation of a segment of a control graph describing a "case" statement.

FIG. 2 shows a 3-D graphical representation of a segment of a control graph describing a "case" statement. The use of three dimensions almost eliminates the chance of edge intersection and enables displaying more information in one frame. It is clear that even though the 3-D representation is more compact than the 2-D equivalent shown in FIG. 1, no information is lost.

Figure 3:
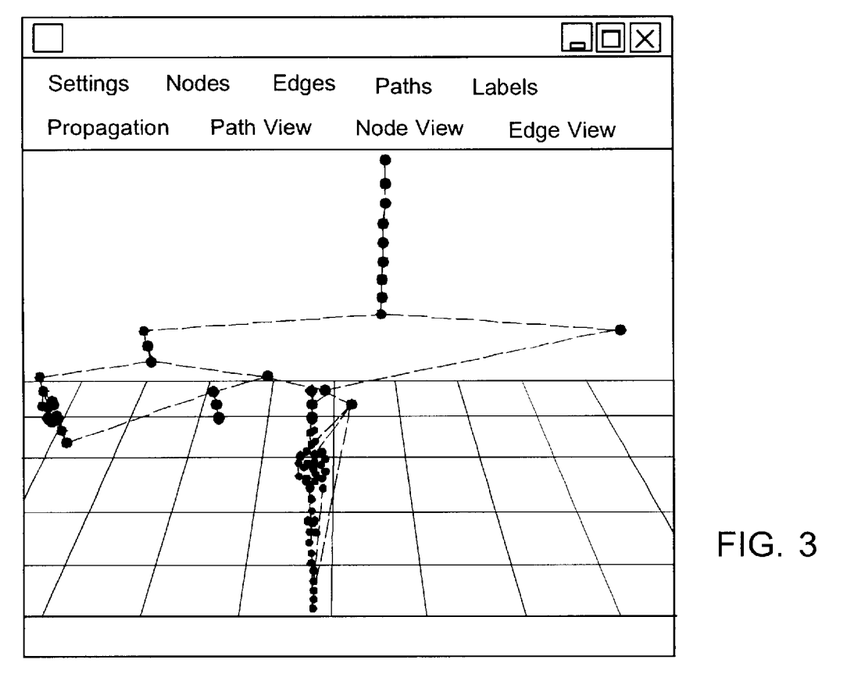
FIG. 3 is a 3-D graphical representation of a complete control graph.

FIG. 3 is a 3-D graphical representation of a complete control graph. It is clear that too much information is contained in the figure to be imparted in 2-D owing to size limitations. In three dimensional layouts not all control graph members are uniformly focused. Some members are positioned further away from the viewing plane than others and some might even be hidden away behind closer graph members. Providing navigation capabilities overcomes these problems. By rotating the graph, one can easily bring "distant" members into focus and reveal hidden ones. Three dimensional navigation is more complex than traditional 2-D scrolling. In order to achieve full navigation capabilities in 3-D space, at least five degrees of freedom must be provided (moving along three axes and rotating around two) to the user. As a result, 3-D navigation is far from trivial and is more difficult to learn than the common 2-D scrolling.

The ability to project more information in one frame is crucial. when visualizing mass data. Though 3-D navigation is not intuitive to the novice user and relatively slow to learn, once mastered it provides a powerful tool as it is preferable to "fly" closer to an unclear part of the graph than to scroll to the hidden parts of the graph. Furthermore, the use of three dimensions not only reduces the problem of intersecting edges but also encourages creative topologies tailored to emphasize specific data.

Previous work on interactive 3-D representation of graphs is described in [11]. Each basic block is represented by a node in the graph, visualized as a sphere and each edge in the graph relates to flow of control between two basic blocks. The layout algorithm is designed to present, in a circle located beneath each basic block, all basic blocks accessible from it. As a result, the flow of control runs from top to bottom as shown in FIG. 3.

Figure 4:
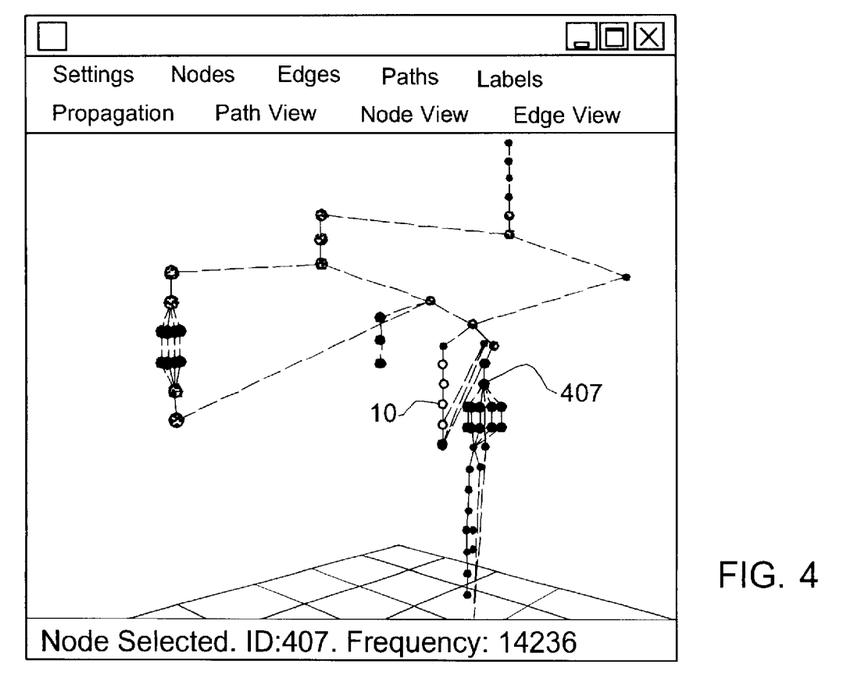
FIG. 4 shows the presentation of statement coverage information in the control graph illustrated in FIG. 3.
Figure 5:
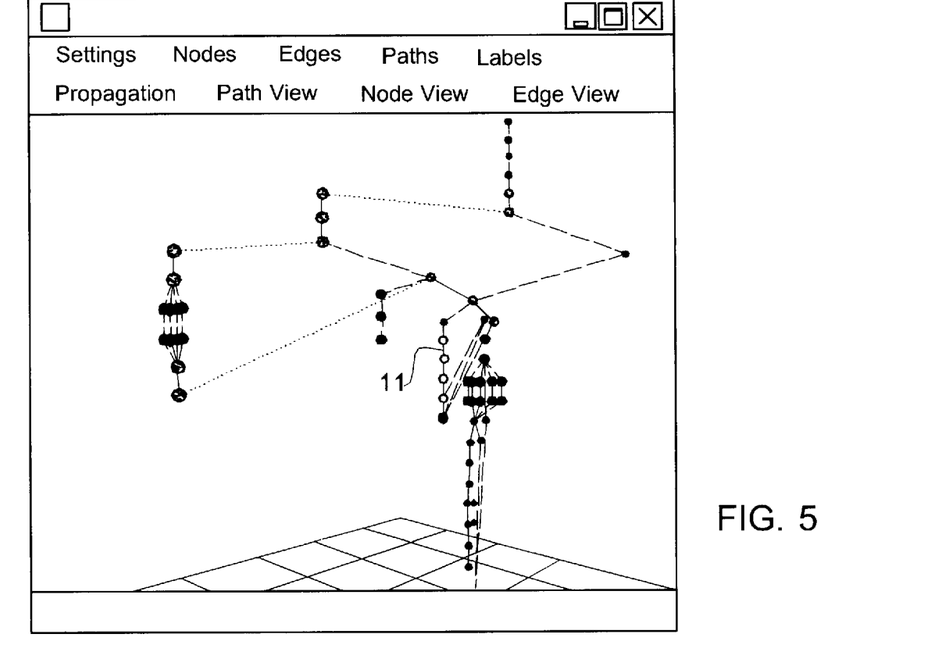
FIG. 5 shows the presentation of branch coverage information in the control graph illustrated in FIG. 3.

FIGS. 4 and 5 show respectively the presentation of statement and branch coverage information. Nodes 10 in the center of FIG. 4 are marked red in a working version of the program. Likewise, in FIG. 5 corresponding edges 11 are marked red and represent a bottleneck in the flow of control which begins at line number 407 of the code (shown in FIG. 4). Once such a bottleneck is found, measures can be taken for optimization of both performance and testing.

Statement and branch coverage information are presented by using attributes of color added to the control graph. A continuous linear color scale 12 is displayed for mapping values to color. The lowest value is mapped to a "cold" color—green, while the highest value is mapped to a "hot" color—red. All intermediate values are mapped accordingly to intermediate colors. The creation of linear color scales is discussed in [6]. The intuitive perception of colors as indicators of value, thus achieved, helps the viewer to gain a global perspective of the flow of control, enabling quick recognition of bottlenecks and poorly tested sub-graphs.

The presentation of values via colors is accompanied by the ability to view specific information about nodes and edges. While the color attributes portray a general image of the flow of control, the connection to the procedure's code is done by inspecting the node information, as illustrated in FIG. 4. By pointing the mouse cursor to a node and clicking it (picking mechanism), the number of the first line in the basic block it represents is attached to it as a label. As shown, this information is also displayed at the bottom of the window, in the status line, together with the number of times it was covered during the testing procedure. By picking graph edges, branch information can be obtained in like manner.

While representation of statement and branch coverage can be achieved by presenting all the coverage information as color attributes added to the control graph (as described above), presentation of path coverage information is more complex. In order to provide an intuitive global view of path coverage information, all paths should be shown simultaneously while enabling easy tracking of each and every individual path. This is not a trivial problem to solve owing to the difficulty of presenting multiple paths passing through a single edge. Furthermore, differentiation between paths must be maintained at all times, which becomes complicated when two paths intersect.

It is common to find edges in the graph, such as ones positioned in bottlenecks of the control flow, that belong to many paths. Attempting to display all these paths simultaneously will result in an unclear image. The invention takes into account that only a finite number of paths passing through a given edge can be differentiated. Therefore, in accordance with the invention, the number of paths to be presented simultaneously is limited and there are provided tools for browsing through several groups of paths.

Though not all paths can be presented at once, it is preferable nevertheless to present as many paths as possible together. The main limitation on the number of paths that can be presented simultaneously, is the need to be able to differentiate between them. The invention addresses this ambiguity by assigning a unique color to each presented path. Thus, the ability to present the various paths is limited only to the number of colors that the human eye can differentiate easily.

Figure 6:
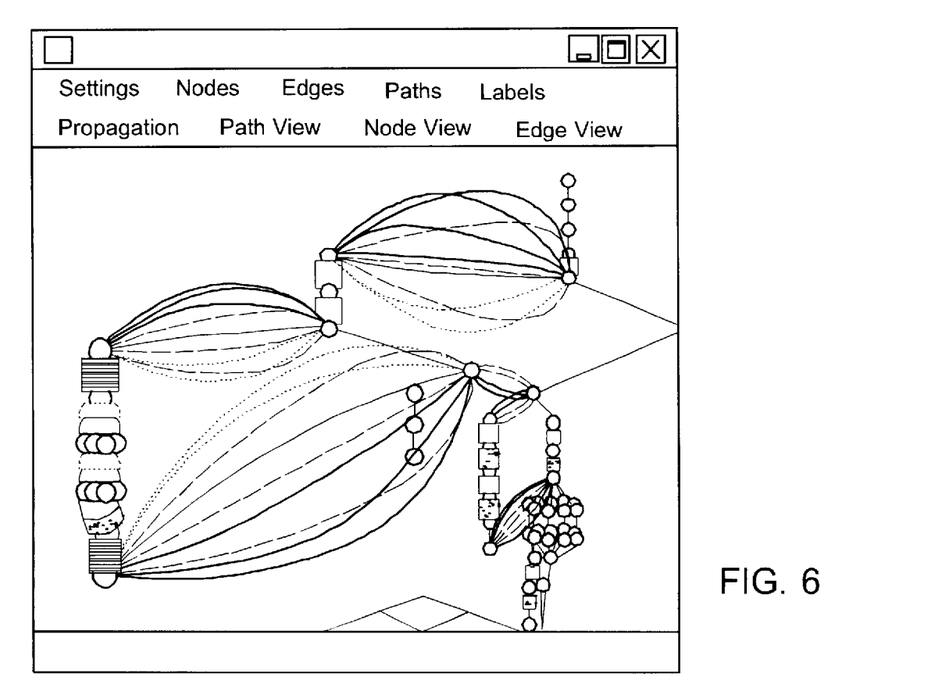
FIG. 6 illustrates the presentation of path coverage as a hypergraph.
Figure 7:
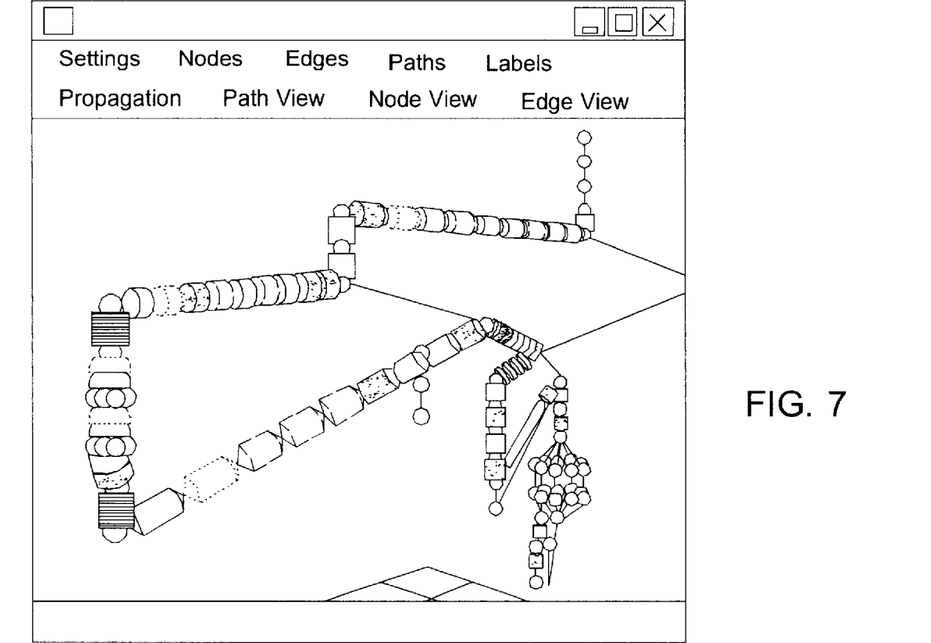
FIG. 7 illustrates the presentation of path coverage as a colored edge sections.

Two different methods are used in the invention for achieving path visualization. FIG. 6 demonstrates the representation of path coverage as a hypergraph wherein path segments are visualized as curved lines surrounding the edges. FIG. 7 presents visualization of path segments as disks positioned along the edges. While the use of hypergraphs provides a continuous presentation of the paths, some of the lines may be hidden. This is due to the fact that not all the lines surrounding an edge can be visible from all viewing angles. The second method shown in FIG. 7 assures that all path segments are visible whilst not cluttering the graph with additional lines. However, in this case, the continuity of the paths is not intuitive. Information relevant to a specific path can be achieved by picking it, in a manner similar to that described above with regard to statement and branch coverage.

Figure 8:
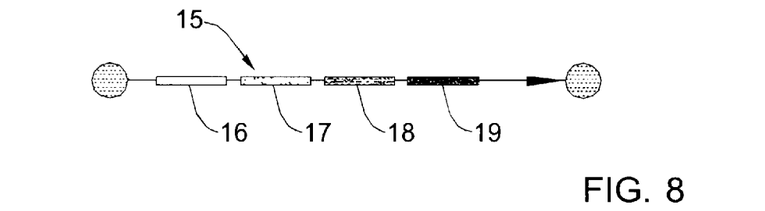
FIGS. 8 to 10 show alternative approaches for color coding edges to represent different execution paths.
Figure 9:
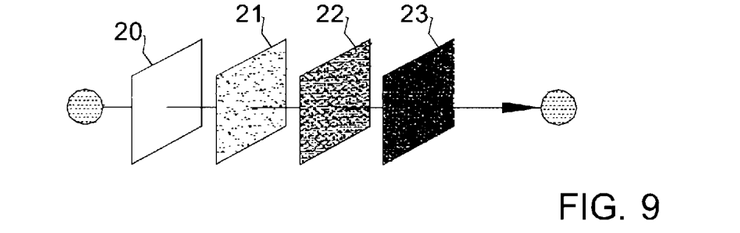
Figure 10:
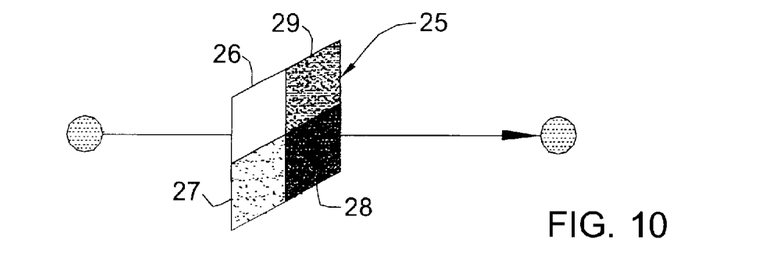

FIGS. 8 to 10 show different ways to color the edges so as to distinguish between different execution paths. In FIG. 8, each edge 15 is divided into a plurality of sections 16, 17, 18, 19 each corresponding to a different execution path, and a unique color is associated with each section. In FIG. 9 a plurality of markers 20, 21, 22, 23 are superimposed on to the edge. Each of the markers corresponds to a different execution path and has a unique color. In FIG. 10, a single marker 25 is superimposed on the edge and is divided into a plurality of sections 26, 27, 28, 29 each corresponding to a different execution path and having a unique color.

Thus in accordance with the invention, 3-D visualization. is used to enable the viewer to encompass larger control graphs in one view. This feature of the presentation provides a global view of the overall control structure which is impossible to achieve in prior art 2-D representation methods. The global view enables easy recognition of the interest points which can be easily examined using the navigation capabilities of the 3-D scene.

Patterns in color, used as a "fourth dimension" are much more easily perceived than representing coverage information in a textual manner, which clutters the image to the point of making it illegible. Using a color scale to represent frequency of coverage information provides an intuitive connection between colors and values.

Figure 11:
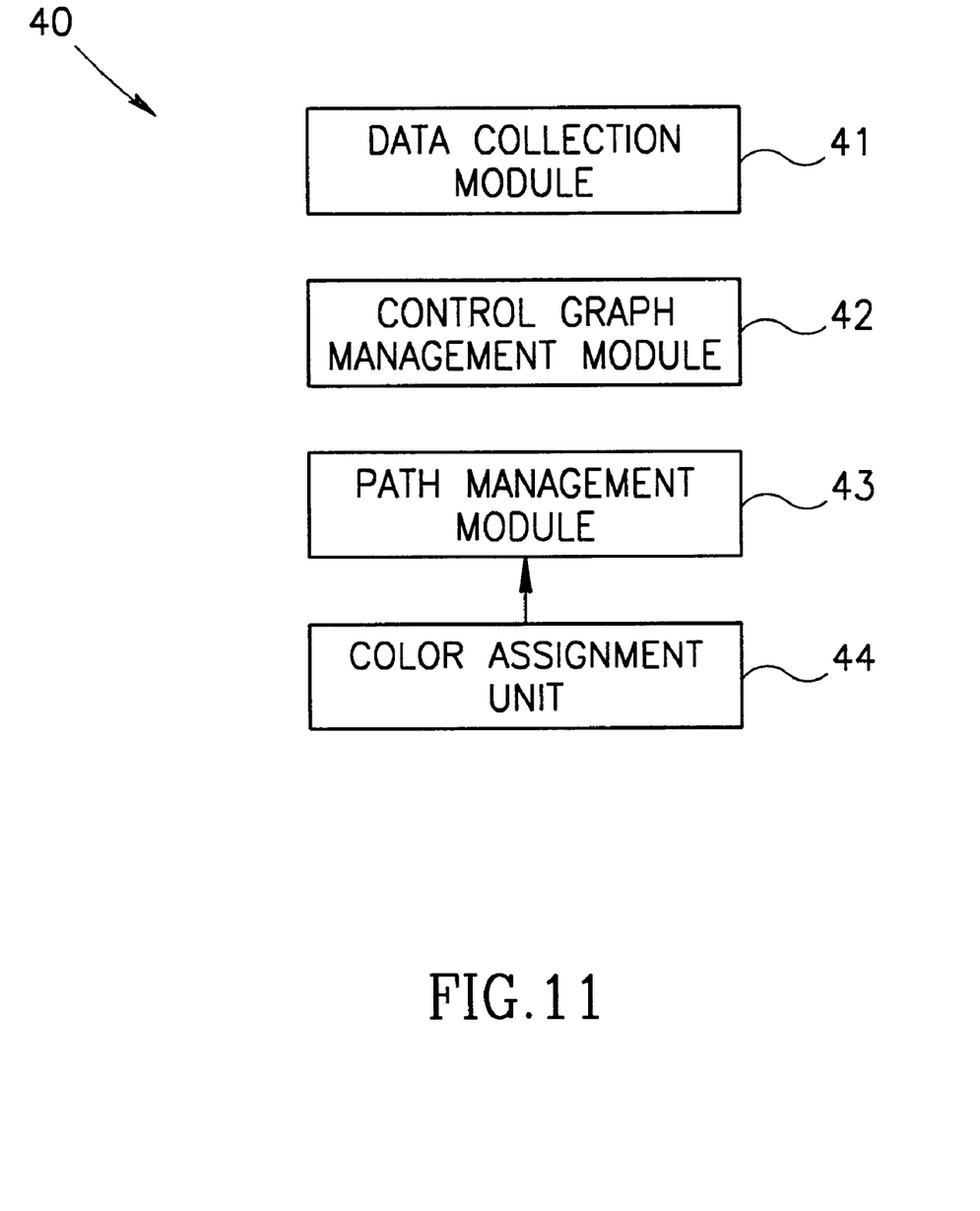
FIG. 11 is a block diagram showing functionally a computer system for graphically displaying execution paths of a computer program component having multiple execution paths.

FIG. 11 is a block diagram showing functionally a computer system 40 for graphically displaying execution paths of a computer program component having multiple execution paths. The system 40 comprises three logical modules: a Data Collection Module 41, a Control Graph Management Module 42 and a Path Management Module 43.

Data Collection Module

The Data Collection Module 41 produces dynamic control flow information of the testing process in three stages. In a first stage, the code of the program is modified to produce a new program, of equal functionality, that produces, trace information. The tested program's code is analyzed to identify possible branching in the control flow and new code lines that produce printouts are automatically added to the code. In a second stage, the new code is compiled and run. The functionality of the original code remains unaffected but a series of printouts, performed during the run, produce a trace file with the control flow information. The third and last phase in this module consists of analyzing the trace and preparing the input files for Control Graph Management Module 42. Three files are produced containing Node, Edge and Path information, respectively. The first two files describe the dynamic Basic Block graph that was found. Each Basic Block is described as a Node in the graph and each control shift from one node to another is described as a connecting edge in the graph. Consecutive edges form a path and forward paths are presented in the third file.

Control Graph Management Module

The Control Graph Management Module 42 receives textual input files describing the control graph and creates a three dimensional graphical image of the graph. The design of this module follows the Model-View-Control paradigm. That is to say, it holds two sub-modules: Model and View, where the View sub-module combines the functionality of both the 'traditional' view and control modules. The implementation of this module was done in C++ and relies on two packages: IBM Open Class for data structures and utility classes and Open-GL for graphical functions.

The first two text files produced Data Collection Module 41, containing a list of the control graph's Basic Blocks and a list of all control branches, are analyzed to create a data base that holds the graph members. Each basic block is held as a graph node and each control branching is stored as an edge in the graph. In practice, two data bases are used to hold graph information, the Model database and View database. As described above, the Model graph is constructed according to the input data.

This Model data structure is referenced, when the View database is created, to retrieve the graph's structural data. While Model graph members hold control flow data (that was extracted from the test runs) the View graph holds visual and graphical attributes (such as location and color) of the graph members. The process of creating the View graph involves positioning of the nodes in a three dimensional space. There are endless possible combinations to set the node in space and, in a preferred embodiment reduced to practice, a tailored algorithm was used by the application for this purpose. The main guidelines of the algorithm's design are:

To produce a 'top to bottom' control flow in a way that basic blocks that were executed later in time will be positioned lower in the graph;

To position all nodes reachable from an arbitrary node (denoted node-X) in a circle underneath node-X. For example, if node-X includes a 'switch' statement with ten different cases, then the algorithm will position those ten nodes in a circle beneath node-X.

It should be noted that the algorithm is semantically unique. This module is used to display graphs in general, and is incorporated in other applications that present graphs of different types that have nothing to do with control flow. Thus, the module can present graphs with different semantic meaning, and for each semantic different positioning and spacing of the nodes are required to achieve the most meaningful view.

The View sub-model also covers the Control functionality (of the model-view-control paradigm). The user can navigate through the 3-D space and is presented with options to color the graph members according to different parameters and to perform queries on specific nodes. Such queries might be on specific numeric attributes or on structural attributes (such as to view all the nodes accessible from a certain node-X).

Path Management Module

The Path Management Module 43 and Control Graph Management Module 42 are tightly connected. In fact, there is no clear definition as to which classes belong to which module. Nevertheless, in a preferred embodiment reduced to practice, the implementation of path handling was added after the control graph module was constructed and was already functional, dealing with presenting graphs of other semantics than program execution control flow. It was convenient to develop of the Path Management Module 43 as a separate logical module from the Control Graph Management Module 42 in order to render the Control Graph Management Module 42 more versatile since it has applications not related to path coverage.

The implementation of the Path Management is based on modifications that are done to existing classes of the graph management module, and introduction of new classes. Additions are made both to the Model and View sub-modules introducing paths as 'first class' graph members with a status similar to nodes and edges. The classes that are added, and those that are changed are listed below with a brief description of their functionality. It should be noted that a naming convention is used, adding 'GM' and 'GV' prefixes to the Model and View modules accordingly.

GMPath—Contains a collection of edges that comprise the path, and a set of utility methods to manage the edge collection.

GMGraph—the GMGraph manages the collections of edges and nodes of the model, it was enhanced to hold a collection of GMPath classes and a set of utility methods to manage that collection.

GVMultEdge—This class holds the heart of the visual presentation of the paths. When presenting multiple paths it is most likely to have a case of an edge that 'hosts' several paths, a case which occurs when several paths share a common segment. GVMultEdge handles such cases. In fact every edge that is part of any path in the graph is of type GVMultEdge (in cases where only one path passes through it, its functionality is reduced to a standard GVEdge). The edge can host up to ten path segments (of ten different paths) and hold methods of managing this repository and of presenting it.

GVPathManager—This class manages the currently displayed paths. It holds two collections, a set of GMPath and a set of GVMultedge classes. The class accesses the path repository in GMGraph to load the ten paths to be displayed and maintains a multiple edge collection according to the edges of these paths. Furthermore, methods exist to enable browsing through GMGraph's path collection and load different sets of paths.

GVGraph—This class manages the collection of GVNodes and GVEdges. The class is enhanced to hold a member of type GVPathManager. New methods are added and existing methods are changed to introduce paths as 'first citizen' graph elements that can be seen, hidden and generally managed in similar manner to nodes and edges.

The anatomy of the path management is based on the GVPathManager, GVGraph and GMGraph classes. Once paths are to be shown the GVPathManager is requested, by GVGraph, to load a batch of paths (a boolean parameter indicates if it should be the next or previous batch in the sequence of the paths). By referencing the GMGraph class, the GVPathManager obtains a reference to the model path collection and holds a cursor in that collection. This cursor allows browsing the collection is a way that maintains its sequence and allows the loading of consecutive path batches. The loaded paths are then analyzed, each is fitted with an ID and then its edges are traversed. The edges of the model paths are used to create a collection of Multiple edges (class GVMultEdge). Each edge of a model path is reflected to be segment of a multiple edge, that holds the ID given to the path by the Path Manager. If a multiple edge with the appropriate binding nodes already exists, the segment will be added to it otherwise, a new multiple edge will be created and initialized to hold the segment.

After a batch of paths is loaded to the path manager, it holds a collection of multiple edges, each composing of the path segments that pass through their bindings nodes. But loading the paths does not present them on the screen, the visual indication that paths are loaded is controlled by the GVGraph class. All visible members hold a draw method that defines their visual representation, this method being triggered by GVGraph's draw method that traverses through the collections of graph elements that are to be shown, and invokes the drawing of all visible graph members.

Each multiple edge can present its segment in one of two ways (though at a given time they all use the same scheme). The first visualization method is to mark each path segment as a curved edge connecting the binding nodes of the edge. All the segments passing through the edge are evenly spaced around the original edge (the line connecting the two nodes). Once the multiple edge is to be drawn it calculates the. angle and position, in space, of each curved edge (based on the number of segments and the relative position of the two nodes). The edges are spatially separated and drawn as Bezier curves, with use of standard Open GL APIs. The other method of presenting the path segments is as cylinders positioned around the original edge (the cylinders are parallel to the line connecting the two binding nodes). The distance between the two nodes is found and the equal length of the cylinders is set so that they will fill that length.

Associated with either the Control Graph Management Module 42 or the Path Management Module 43 is a color assignment unit 44 for assigning distinct color attributes to each edge of the edge collections according to a predetermined scheme. Although color attributes are particularly well-suited to distinguish different edges of the graphical data structure, it will be appreciated that any other suitable display attribute may be used for this purpose. Color (or any other suitable and distinct display attribute) may be associated with the edges in various ways:

the edges may be spatially separated and a distinct color associated with each edge; or each edge may be divided into a plurality of cylindrical line sections each corresponding to a different execution path, and a unique color may be associated with each section; or a plurality of markers each corresponding to a different execution path and each having a unique color may be superimposed on each edge.

Figure 12:
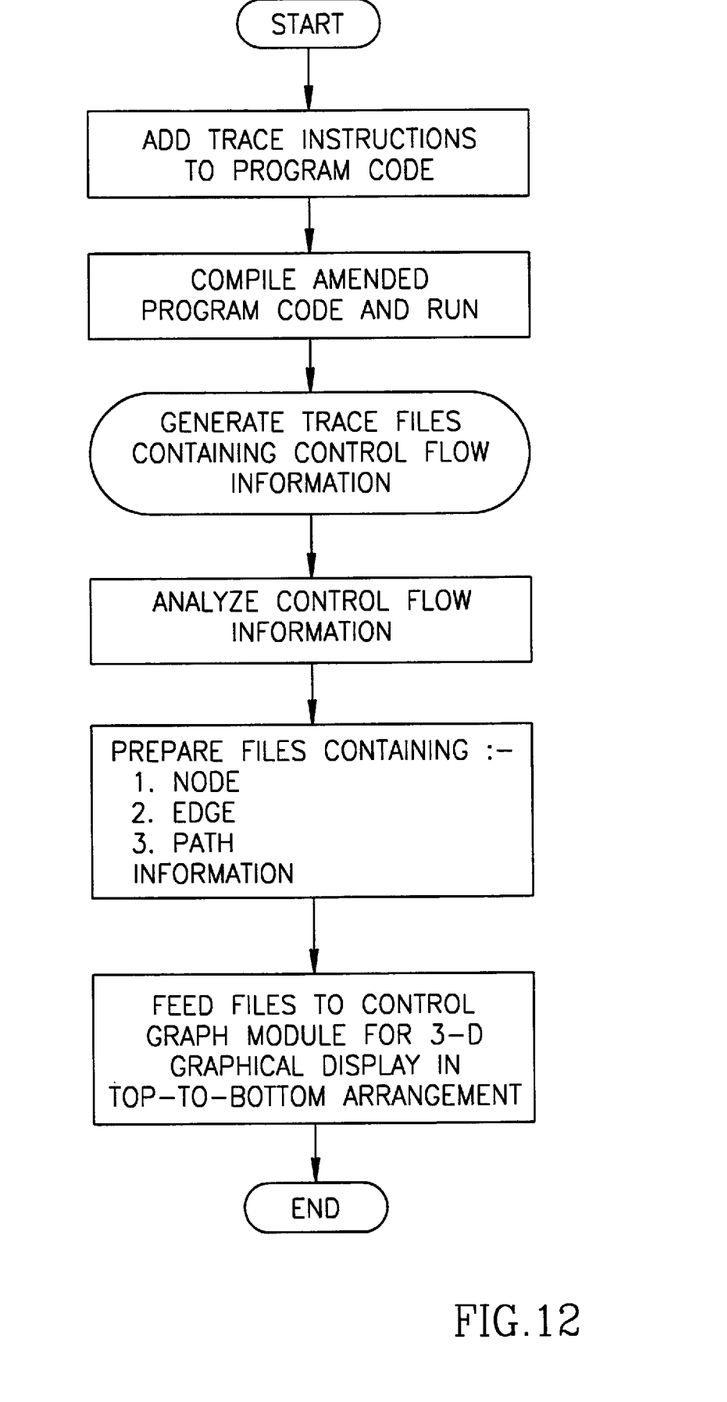
FIGS. 12 and 13 are flow diagrams showing the main operating steps carried out by the system of FIG. 11.
Figure 13:
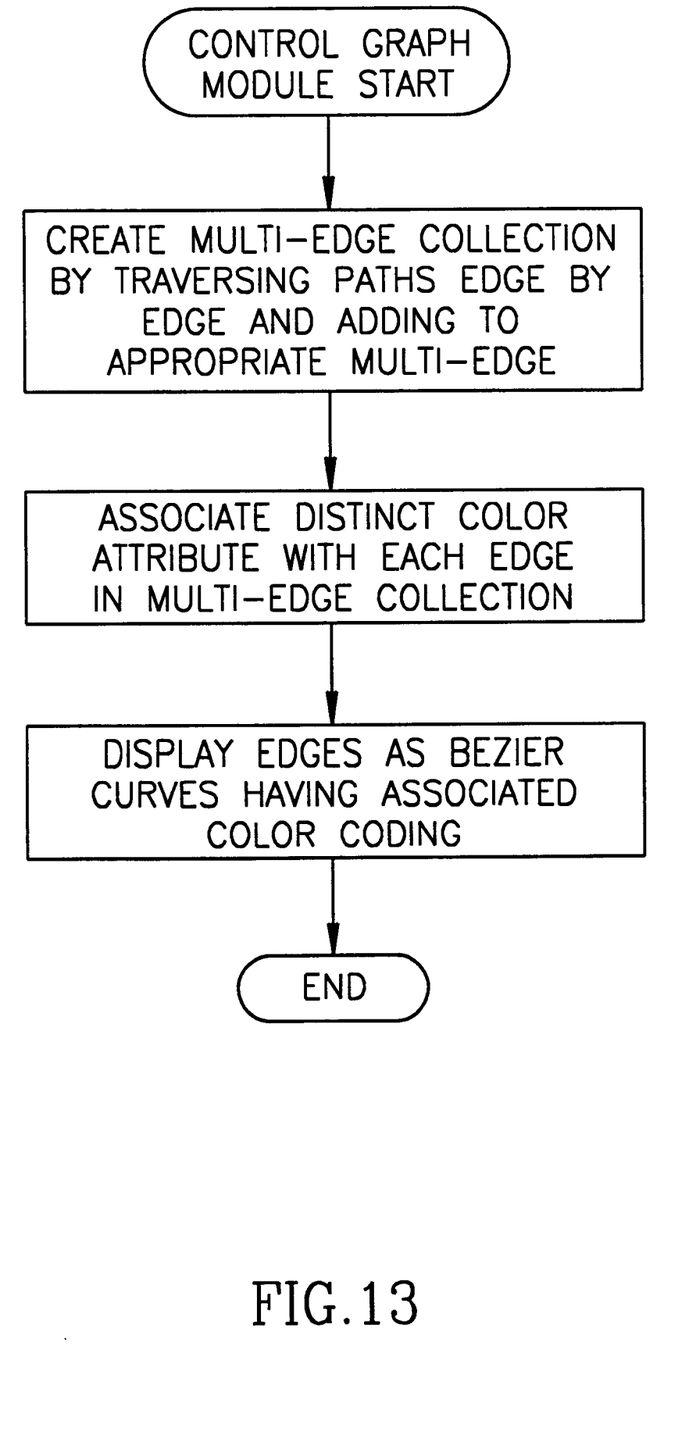

With reference to FIGS. 12 and 13, there will now be described, step by step, the process of presenting the execution paths by the application, it being observed that only the principal steps are shown in the figures.

The code of the program is passed as an input to a tool that analyzes the code, finds the command lines at the end of each basic block and adds trace instructions by inserting printout messages to the file in those places. The new code is compiled to produce an executable which is run, thereby producing trace files. The trace files are processed to create input files of the format required by the graphic application. The above four steps are performed by the Data Collection Module 41 shown in FIG. 11.

The graphic application is then invoked by the Control Graph Management Module 42 and the Path Management Module 43. Input files are used to create a model graph data base and a collection of model paths, thus showing constituent nodes and interconnecting edges. The layout algorithm positions the nodes in the virtual 3-D space using a top down approach. At the request of the user, a batch of paths is loaded to the Path Manager which deals with path representation. Each loaded path is assigned a unique ID, and a color. The loaded paths are traversed, edge, by edge, inserting each path segment to the multiple edge collection. Thus, between any two nodes, there may be many edges each representative of a respective partial path. Every multiple edge created holds a repository of segments, each holding the ID of its path and its color (as assigned by the Path Manager). When the paths are to be shown on screen, the graph's draw method invokes the draw method of all the Path Manager's multiple edges. Each multiple edge presents its segments in one of the following ways (according to the appropriate state variable):

The segments may be presented as curved edges spaced equally around the line connecting the binding nodes; or The segments may be presented as cylinders, of equal length, surrounding the original edge.

Whilst the invention has been described with particular regard to the representation of path coverage in a computer program, it will be apparent that the invention finds general application to the graphical presentation of data structures having nodes and interconnecting edges.

What is claimed is:

1. A computer-implemented method for displaying data representative of at least two edges branching between a pair of nodes so as to allow the edges to be separately identifiable, the method comprising the steps of:

(a) assigning different display attributes to the edges so that the edges can be visually distinguished, and (b) displaying said data structure graphically in 3-D.

2. The method according to claim 1, wherein the edges are representative of segments of execution paths in a computer program component, and prior to step (a) there is included the step of:

(i) processing the computer program component so as to derive a data structure containing said nodes being representative of all basic blocks thereof, said edges representing lines connecting said nodes, and said execution paths being traversed during operation of the computer program component.

3. The method according to claim 1, wherein the step of assigning different display attributes to the edges comprises:

(i) associating a unique display attribute with each edge, and (ii) spatially separating the edges.

4. The method according to claim 1, wherein the step of assigning different display attributes to the edges comprises:

(i) dividing each edge into a plurality of sections each corresponding to a different edge collection, and (ii) associating a unique display attribute with each section.

5. The method according to claim 1, wherein the step of assigning different display attributes to the edges comprises:
(i) superimposing on each edge a plurality of markers each corresponding to a different edge collection and each having a unique display attribute.

6. The method according to claim 1, wherein the display attributes are different colors.

7. The method according to claim 1, wherein the display attributes are different shades.

8. The method according to claim 1, wherein the step of assigning different display attributes to the edges comprises:
(i) superimposing on each edge a marker divided into a plurality of sections each corresponding to a different edge collection and each having a unique display attribute.

9. The method according to claim 2, wherein the step of assigning different display attributes to the edges comprises:
(i) dividing each edge into a plurality of sections each corresponding to a different edge collection, and
(ii) associating a unique display attribute with each section.

10. The method according to claim 2, wherein the step of assigning different display attributes to the edges comprises:
(i) superimposing on each edge a plurality of markers each corresponding to a different edge collection and each having a unique display attribute.

11. The method according to claim 2, wherein the display attributes are different colors.

12. The method according to claim 2, wherein the display attributes are different shades.

13. The method according to claim 2, wherein the step of assigning different display attributes to the edges comprises:
(i) superimposing on each edge a marker divided into a plurality of sections each corresponding to a different edge collection and each having a unique display attribute.

14. A computer system for displaying data representative of at least two edges branching between a pair of nodes so as to allow the edges to be separately identifiable, the system comprising:
an attribute assignment unit for assigning different display attributes to the edges so that the edges can be visually distinguished, and
a display device for displaying said data structure graphically in 3-D.

15. The system according to claim 14, wherein the attribute assignment unit includes:
a Data Collection Module for processing the data so as to derive trace information, and
a Control Graph Management Module for processing the trace information so as to derive multiple edge collections between adjacent nodes;
a display attribute assignment unit for assigning distinct display attributes to each edge of said edge collections according to a predetermined scheme.

16. The system according to claim 15, wherein the edges are representative of segments of execution paths in a computer program component and the display attribute assignment unit further includes:
a Path Management Module coupled to the Control Graph Management Module for assigning said distinct display attributes to each edge of said edge collections.

17. The system according to claim 15, wherein the attribute assignment unit is adapted to:
(i) associate a unique display attribute with each edge, and
(ii) spatially separate the edges.

18. The system according to claim 15, wherein the display attribute assignment unit is adapted to:
(i) divide each edge into a plurality of sections each corresponding to a different edge collection, and
(ii) associate a unique display attribute with each section.

19. The system according to claim 15, wherein the display attribute assignment unit is adapted to:
(i) superimpose on each edge a plurality of markers each corresponding to a different edge collection and each having a unique display attribute.

20. The system according to claim 15, wherein the display attribute assignment unit is adapted to:
(i) superimpose on each edge a marker divided into a plurality of sections each corresponding to a different edge collection and each having a unique display attribute.

21. The system according to claim 14, wherein the display attributes are different colors.

22. The system according to claim 14, wherein the display attributes are different shades.

23. The system according to claim 16, wherein the attribute assignment unit is adapted to:
(i) associate a unique display attribute with each edge, and
(ii) spatially separate the edges.

24. The system according to claim 16, wherein the attribute assignment unit is adapted to:
(i) divide each edge into a plurality of sections each corresponding to a different edge collection, and
(ii) associate a unique display attribute with each section.

25. The system according to claim 16, wherein the attribute assignment unit is adapted to:
(i) superimpose on each edge a plurality of markers each corresponding to a different edge collection and each having a unique display attribute.

26. The system according to claim 16, wherein the attribute assignment unit is adapted to:
(ii) superimpose on each edge a marker divided into a plurality of sections each corresponding to a different edge collection and each having a unique display attribute.

27. The system according to claim 16, wherein the display attributes are different colors.

28. The system according to claim 16, wherein the display attributes are different shades.

* * * * *